June 28, 1955  C. H. LENGYEL  2,711,552
SCRAPER
Filed March 13, 1951
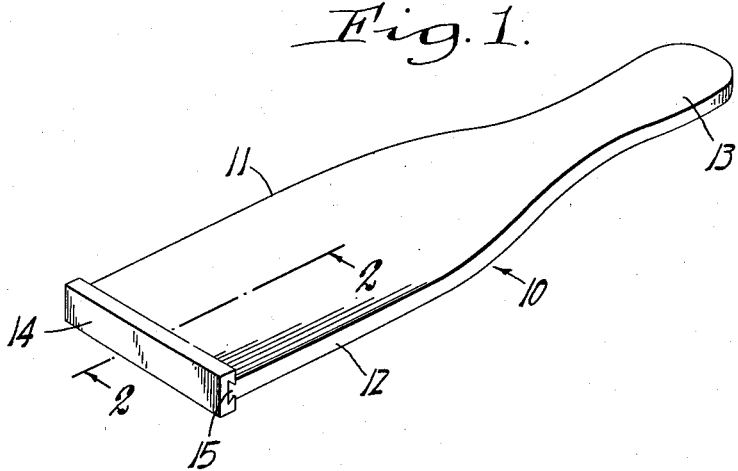
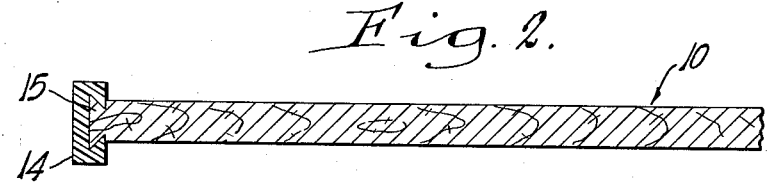
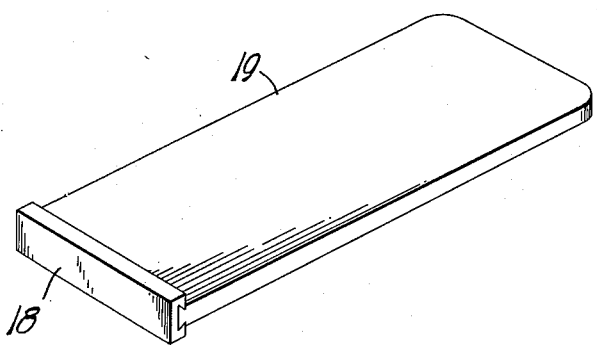
Inventor
Carl H. Lengyel
by
Bean, Brooks, Buckley & Bean
Attorneys United States Patent Office 2,711,552
Patented June 28, 1955

2,711,552

SCRAPER

Carl H. Lengyel, Buffalo, N. Y.

Application March 13, 1951, Serial No. 215,330

4 Claims. (Cl. 15—236)

This invention relates to devices for scraping ice and sleet from glass or like surfaces and particularly to scrapers of the general class now widely used in clearing automotive windshields of ice, sleet and snow.

Devices of this class now in common use usually comprise a handle element which may be of any relatively rigid material and a scraper element which is commonly a plate or slab of synthetic resin material, one edge of the plate comprising the scraping edge of the device. A wide variety of the many commercial synthetic resin materials may be employed but the acrylic resins, especially those available commercially as "Plexiglas" and "Lucite," have generally been employed for this purpose as being hard and rigid enough to accomplish the desired scraping function and wear well under continued use, and yet not hard enough to scratch or otherwise damage a glass surface.

The usual manner of constructing devices of this general nature is to provide a plate of the resin material wherein one side is adapted as the scraping edge and handle means are attached to the plate in such manner as to project away from the plate at the edge opposite the scraping edge, the handle extending away from the plate generally in the plane of the plate itself.

This of course requires that the plate have enough width, at right angles to the scraping edge, to provide space for attachment to the handle. Also, since the handle is generally thicker than the plate in these prior art scrapers, or at least projects from the plate in a direction at right angles to the plane of the plate, the plate comprising the scraping element must be of enough width, at right angles to the scraping edge, to apply the scraping edge to the glass with the holder making a very acute angle with the glass, this being the position which is found to give the most effective scraping result, especially with the more tenacious ice and sleet deposits.

I have found that by providing a novel relationship of the scraping element and the handle a great many advantages are attained. Although using considerably less of the synthetic resin material, which is a principal element of cost in manufacturing scrapers of this general class, I still provide a scraper having six distinct and useful scraping edges instead of the usual one scraping edge.

Further, two of the scraping edges, those at the ends of the scraping element, are relatively narrow and are especially useful for scraping edge portions of a glass surface, such for instance as the narrow space between a parked windshield wiper and the windshield frame. These narrow scraping edges are further particularly useful in scraping windshield wiper blades which have become encrusted with ice or sleet.

It is a further object of my invention to provide a device of this class wherein the side edges of the handle element, for its entire length or at least for a considerable distance from the scraping element, form straight lines extending flush from the ends of the scraper element and at right angles thereto. The device is thus rendered additionally and especially useful in scraping off or plowing off substantial deposits of snow from a windshield, from the cowl and hood just ahead of the windshield, and from rear windows of vehicles.

Two embodiments of the principles of the present invention are illustrated in the drawing and described in detail in the following specification by way of example. It is to be understood, however, that these embodiments are merely illustrative and that various modifications may be made without departing from the underlying principles of my invention, the scope of which is limited only as defined in the appended claims.

In the drawing:

Fig. 1 is a perspective view of one form of the device of the present invention;

Fig. 2 is a fragmentary cross-sectional view on the line 2—2 of Fig. 1; and

Fig. 3 is a perspective view of a modified form of the device of the present invention.

Referring to Fig. 1, the numeral 10 designates generally a handle of wood or other suitable material which is relatively flat and provided with parallel side portions at one end as at 11 and 12, the opposite end being shaped to provide a gripping portion 13. The scraping element comprises a relatively narrow rectangular plate 14 of acrylic synthetic resin material or its equivalent.

Plate 14 has a longitudinal central dovetail groove in one of its flat faces and the scraping end of hande element 10 is provided with a dovetail tongue 15 for assembly in the groove of the plate 14. The tongue and groove dovetail joint may be tight enough to require no further securement, although suitable cement or other securing means may be additionally provided if desired.

It will be noted that the four longitudinal edges of plate 14 are available for scraping service as well as the shorter outer end edges thereof, as generally outlined in the preamble to this specification.

In the emobdiment of Fig. 3 a scraping element 18 identical with that of Figs. 1 and 2 is provided and a handle element 19 which is the same as that of Figs. 1 and 2 excepting that its side edges are parallel throughout, thereby rendering available snow removing or plowing edges of greater length in proportion to the overall length of the device.

What is claimed is:

1. An ice and sleet scraper for windshields comprising a handle element and a scraping element, said handle element including a relatively flat rectangular portion with one of the shorter sides of said rectangular portion comprising the scraping element end of the handle portion and having a central longitudinal tongue extending therealong, said scraping element comprising a rectangular plate of synthetic resin material having square edges, the longer dimension of the rectangular scraping element being substantially equal to the width of the scraping element end of the handle element and said scraping element having a central longitudinal groove in one of its flat faces for receiving said tongue whereby the scraping element is fixed flatwise and centrally against said end of the handle element so that its width dimension extends at right angles to the handle element and projects beyond both faces of the handle element with the thickness dimension of the scraping element extending in the same direction as the length of said handle element and with the ends of the scraping element flush with the side edges of the handle element.

2. An ice and sleet scraper for windshields comprising a handle element and a scraping element, said handle element including a relatively flat rectangular portion with one of the shorter sides of said rectangular portion comprising the scraping element end of the handle portion, said scraping element comprising a rectangular plate of synthetic resin material having square edges, the longer dimension of the rectangular scraping element being substantially equal to the width of the scraping element end of the handle element and said scraping element being fixed flatwise and centrally against said end of the handle element so that its width dimension extends at right angles to the handle element and projects beyond both faces of the handle element with the thickness dimension of the scraping element extending in the same direction as the length of said handle element and with the ends of the scraping element flush with the side edges of the handle element.

3. An ice and sleet scraper for windshields comprising a handle element and a scraping element, said handle element including a relatively flat rectangular portion with one of the shorter sides of said rectangular portion comprising the scraping element end of the handle portion and having a dovetail tongue formation extending therealong, said scraping element comprising a rectangular plate of synthetic resin material having square edges, the longer dimension of the rectangular scraping element being substantially equal to the width of the scraping element end of the handle element and said scraping element having a central longitudinal dovetail groove in one of its flat faces for interlocking engagement with the dovetail formation of the handle element whereby the scraping element is fixed flatwise and centrally against said end of the handle element so that its width dimension extends at right angles to the handle element and projects beyond both faces of the handle element with the thickness dimension of the scraping element extending in the same direction as the length of said handle element and with the ends of the scraping element flush with the side edges of the handle element.

4. An ice and sleet scraper for windshields comprising a flat oblong handle element and a scraping element, said scraping element comprising a rectangular plate of synthetic resin material having square edges, the longer dimension of the rectangular scraping element being substantially equal to the width of the scraping element end of the handle element and said scraping element being fixed flatwise and centrally against said end of the handle element so that its width dimension extends at right angles to the handle element and projects beyond both faces of the handle element with the thickness dimension of the scraping element extending in the same direction as the length of said handle element and with the ends of the scraping element flush with the side edges of the handle element.

References Cited in the file of this patent

UNITED STATES PATENTS

| | | | |
|---|---|---|---|
| D. 34,241 | Leach | Mar. 19, | 1901 |
| D. 122,685 | Jones | Sept. 24, | 1940 |
| 92,034 | Frey et al. | Jan. 29, | 1869 |
| 1,670,646 | Abrahamsen | May 22, | 1928 |
| 2,188,114 | Hubbard | Jan. 23, | 1940 |

FOREIGN PATENTS

| | | | |
|---|---|---|---|
| 26,938 | Great Britain | Feb. 25, | 1899 |
| 212,889 | Germany | Aug. 21, | 1909 |
| 123,408 | Sweden | Nov. 23, | 1948 |